United States Patent
Karri et al.

(10) Patent No.: US 12,326,710 B2
(45) Date of Patent: Jun. 10, 2025

(54) CREATING STRING-BASED FORCE COMPONENT FROM DIFFERENT DIRECTIONS DURING OVERHANG THREE-DIMENSIONAL PRINTING

(71) Applicant: International Business Machines Corporation, Armonk, NY (US)

(72) Inventors: Venkata Vara Prasad Karri, Visakhapatnam (IN); Sarbajit K. Rakshit, Kolkata (IN); Girish Padmanabhan, Pune (IN); Ravindra Kumar Venkata Konatham, Visakhapatnam (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 106 days.

(21) Appl. No.: 17/398,395

(22) Filed: Aug. 10, 2021

(65) Prior Publication Data
US 2023/0047710 A1 Feb. 16, 2023

(51) Int. Cl.
| | |
|---|---|
| *B33Y 30/00* | (2015.01) |
| *B29C 64/25* | (2017.01) |
| *B29C 64/393* | (2017.01) |
| *B33Y 50/02* | (2015.01) |
| *G05B 19/4099* | (2006.01) |

(52) U.S. Cl.
CPC .......... *G05B 19/4099* (2013.01); *B29C 64/25* (2017.08); *B29C 64/393* (2017.08); *B33Y 30/00* (2014.12); *B33Y 50/02* (2014.12); *G05B 2219/49023* (2013.01)

(58) Field of Classification Search
CPC ......... B33Y 30/00; B33Y 50/02; B33Y 99/00; B33Y 10/00; B29C 64/386–393; B29C 64/25; B29C 64/10–118; B29C 64/188–194; B29C 64/209; B28B 1/001
See application file for complete search history.

(56) References Cited

U.S. PATENT DOCUMENTS

| | | | |
|---|---|---|---|
| 9,688,024 B2 | 6/2017 | Stava | |
| 2013/0197683 A1* | 8/2013 | Zhang | B22F 10/66 700/96 |
| 2013/0292039 A1* | 11/2013 | Peters | B22D 11/01 156/349 |
| 2017/0036783 A1* | 2/2017 | Snyder | B23K 9/044 |
| 2017/0095973 A1* | 4/2017 | Chamberlain | B29C 64/329 |
| 2018/0065311 A1 | 3/2018 | Lefebvre et al. | |

(Continued)

OTHER PUBLICATIONS

Mel, et al. "The NIST Definition of Cloud Computing". Recommendations of the National Institute of Standards and Technology. Nov. 16, 2015.

(Continued)

*Primary Examiner* — Andrew L Swanson
(74) *Attorney, Agent, or Firm* — Steven M. Bouknight

(57) ABSTRACT

A computer-implemented string based force component creation method for a three-dimensional (3D) printer that interacts with a three-dimensional (3D) printer that is installed in a printing apparatus and that prints an object, the method including attaching a string mechanism to the 3D printer, and creating a force component to support the 3D printer and the object via the string mechanism that is attached to the 3D printer.

16 Claims, 9 Drawing Sheets

(56) References Cited

U.S. PATENT DOCUMENTS

| | | |
|---|---|---|
| 2018/0194079 A1 | 7/2018 | Hardee et al. |
| 2019/0111620 A1* | 4/2019 | McKinney ............. B33Y 40/00 |
| 2019/0275737 A1* | 9/2019 | Hsiao .................... B29C 64/205 |
| 2020/0122406 A1 | 4/2020 | Bigos et al. |
| 2020/0290287 A1* | 9/2020 | Grosch ................... B22F 12/20 |

OTHER PUBLICATIONS

Aaron Chen, "How to improve 3D print overhangs and bridges", C-MAC industries Pty Ltd. Innovative Metal Solutions.; Sep. 5, 2019.

Authors et al., Disclosed Anonymously, "Mechanical Fasteners Through Part and Print Platform in Additive Manufacturing to Increase Platform Retention", An IP.com Prior Art Database Technical Disclosure; IP.com No. IPCOM000261056D; IP.com Electronic Publication Date; Jan. 23, 2020.

Jiang, et al. "Support Structures for Additive Manufacturing: A Review", Journal of Manufacturing and Materials Processing; Department of Mechanical Engineering, University of Auckland; 2018.

\* cited by examiner roller 203

Bobbin shapped roller

CREATING STRING-BASED FORCE COMPONENT FROM DIFFERENT DIRECTIONS DURING OVERHANG THREE-DIMENSIONAL PRINTING

BACKGROUND

The present invention relates generally to a string-based force component creation method and system thereof, and more particularly, but not by way of limitation, to a system and method for a three-dimensional (3D) printer creating appropriate force components in one or more directions with a string and a lock-based mechanism.

A 3D printing process builds a three-dimensional object from a computer-aided design (CAD) model, usually by successively adding material layer by layer. As a result, it is also called additive manufacturing. The term "3D printing" covers a variety of processes in which a material is joined or solidified under computer control to create a 3D object, with material being added together (e.g., such as liquid molecules or powder grains being fused together), typically layer by layer. A 3D printer can be used for printing a new object or can be used for repairing an object.

Conventionally, while performing a repair with 3D printing in any critical area, the printed or repaired portion might need physical support. Otherwise, without physical support, there may be a deformation in the object because of self-weight of the printed or repaired portion.

Some conventional techniques propose a physical support on an object with a different material so that the object does not create any deformation on the object while the object is being printed. However, these conventional techniques do not consider the stability of the printer itself during printing.

Therefore, there is a problem in the art that the conventional techniques do not support both the object and the 3D printer.

SUMMARY

Thus, the inventors have considered a technical solution to the technical problem in the conventional techniques by designing an appropriate supporting method and system to ensure there is no deformation in a 3D printed portion because of self-weight of the printed portion, while also supporting the 3D printer itself. Indeed, while performing repairing with 3D printing in any critical area, the printed or repaired portion needs physical support. Otherwise, there is a deformation in the object because of self-weight of the printed or repaired portion, Thus, the technical solution includes a method and system by which, a 3D printer itself creates an appropriate force component(s) from one or more directions with a string and a lock-based mechanism, and these force components will provide physical support to the hanging 3D printed portion. The method and system can ensure no deformation on the printed portion.

In an exemplary embodiment, the present invention can provide a computer-implemented string-based force component creation method that interacts with a three-dimensional (3D) printer that prints an object and is installed in a printing apparatus, the method including creating a force component to support the 3D printer and the object via a string mechanism that is attached to the (3D) printer.

In another exemplary embodiment, the present invention can provide a printing system that includes a printing apparatus including a hanging portion, a three-dimensional (3D) printer that prints an object within the printing apparatus, and a force component that is paired between the 3D printer and the hanging portion to provide stability to the 3D printer while a printing operation is performed.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings.

Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes (and others) of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 7 exemplary depicts a connected of the force component to the structure 200a;

DETAILED DESCRIPTION

Figure 1:
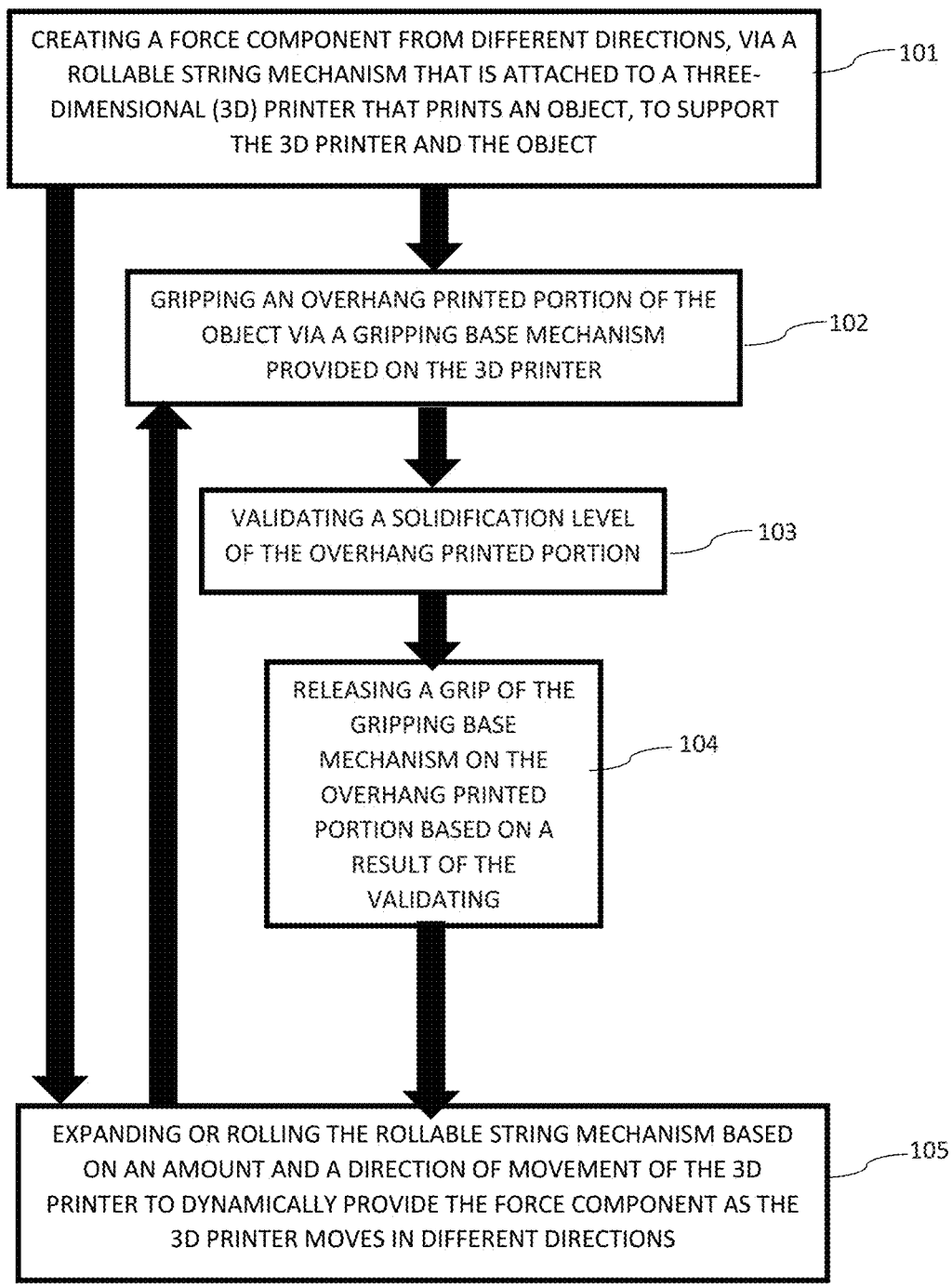
FIG. 1 exemplarily shows a high-level flow chart for a string-based force component creation method 100.

The invention will now be described with reference to FIG. 1-10, in which like reference numerals refer to like parts throughout. It is emphasized that, according to common practice, the various features of the drawing are not necessarily to scale. On the contrary, the dimensions of the various features can be arbitrarily expanded or reduced for clarity.

By way of introduction of the example depicted in FIG. 1, an embodiment of a dynamic supporting base creation method 100 according to the present invention can include various steps for a novel technique for enabling 3D printing from all angles, directions and orientations, using robotic gripper(s) that form a dynamic base by exchanging the object therebetween.

Figure 8:
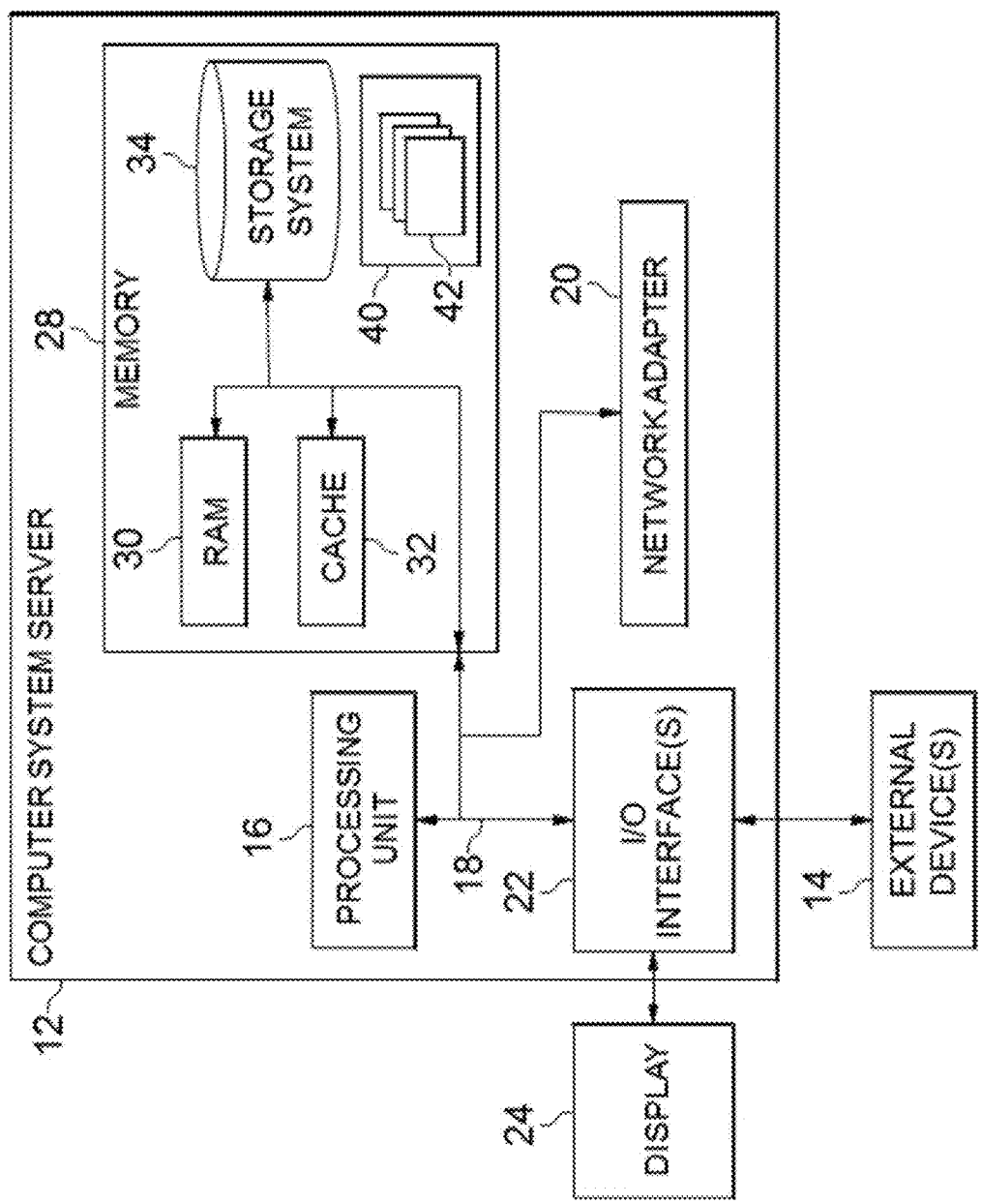
FIG. 8 depicts a cloud-computing node 10 according to an embodiment of the present invention.

By way of further introduction of the example depicted in FIG. 8, one or more computers of a computer system 12 according to an embodiment of the present invention can include a memory 28 having instructions stored in a storage system to perform the steps of FIG. 1.

Although one or more embodiments may be implemented in a cloud environment 50 (e.g., FIG. 10), it is nonetheless understood that the present invention can be implemented outside of the cloud environment.

Figure 2:
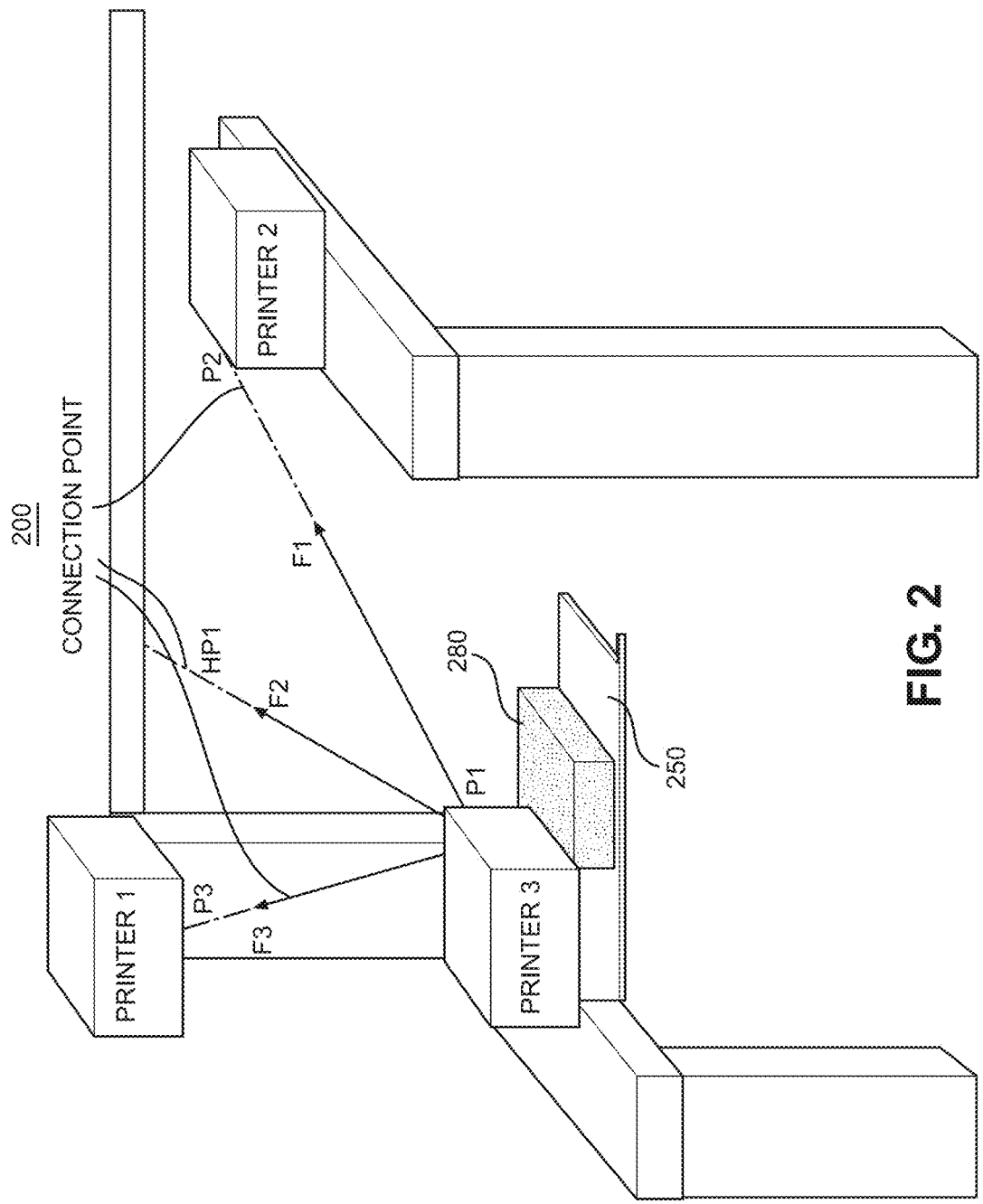
FIG. 2 exemplarily depicts an example a string-based force component system 200.

With reference now to the exemplary method 100 depicted in FIG. 1 and the printing system 200 depicted in FIG. 2, the invention can use one or more force components to ensure a stability of the 3D printer while printing in any unstable area, and multi-3D printer systems can collaborate with each other to create stability force for each other while printing in any unstable area via the inventive force components (e.g., a "string" as described below). Also, the 3D printer can print string with secondary material for its own stability, and along with the stability 3D printer, the 3D printer will also be ensuring the prevention of printed area deformation with spring-based force.

It is noted that although the "force component" is described as a "string", a wire, a cable, metal string, nylon fabric thread, etc. can be used that is capable of being printed by the 3D printer and supporting the 3D printer during printing.

With reference generally to FIGS. 2-7, the system 200 includes a printing apparatus 200a and at least one 3D printer. FIGS. 2-7 depict how the strings provide a force component(s) from different directions and make the 3D printer stable. Also, it is depicted how the overhang printing portion 260 is made stable via a "gripper" 250 (as described later and referenced as a "gripper" or "gripper base") that is configured on the 3D printer itself.

Figure 3:
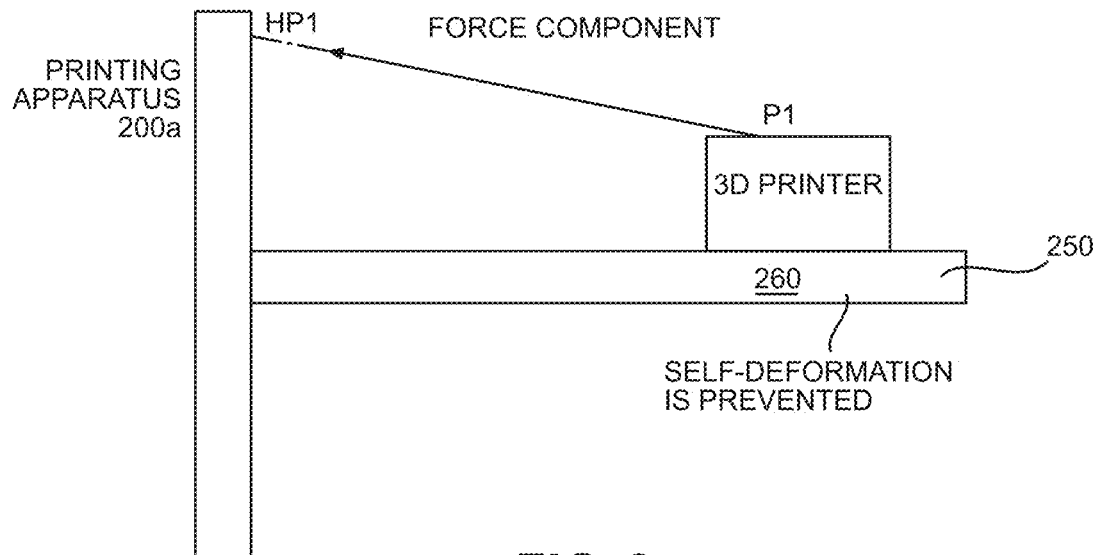
FIG. 3 exemplarily depicts a 3D printer support via a string-based force component on an overhang printed portion.
Figure 4:
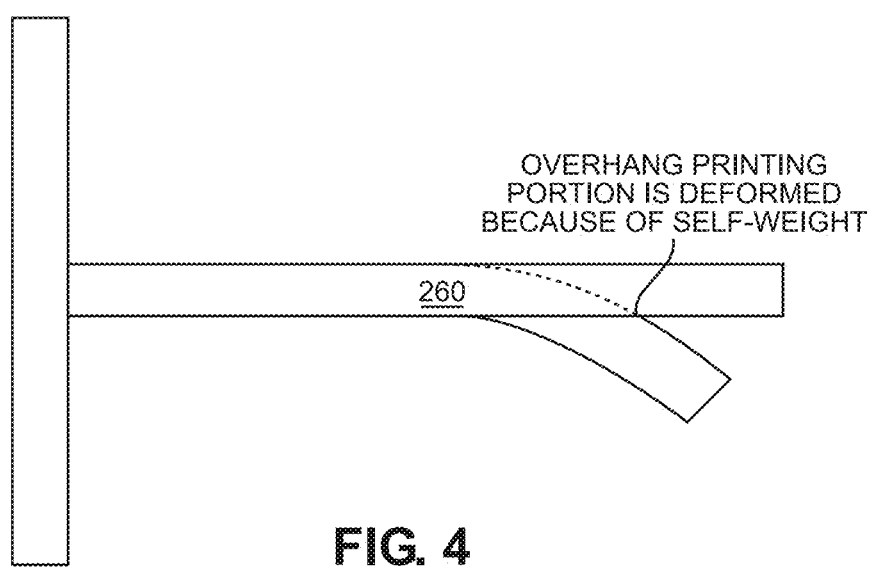
FIG. 4 exemplarily depicts a deformation of the overhang printed portion without the use of the string-based force component.

With reference specifically to the structure of the system 200, the system includes a three-dimensional (3D) printer that has a gripper base 250 (e.g., for gripping the overhang) so that 3D printing can be performed on the base while being stable (e.g., see FIGS. 3-4). The printing apparatus includes a structure to which the force components can be attached (e.g., see FIGS. 2-3). The 3D printer includes a collapsible base, which can be removed and can be created. One exemplary purpose of the base is to provide physical support while performing printing on the overhang portion (e.g., see FIGS. 3-4). For Example, the base 250 can extend from the printer and the object 280 can be printed on the base 250 while the 3D printer is support via the force component so that the object 280 is supported as well as the 3D printer.

Figure 5:
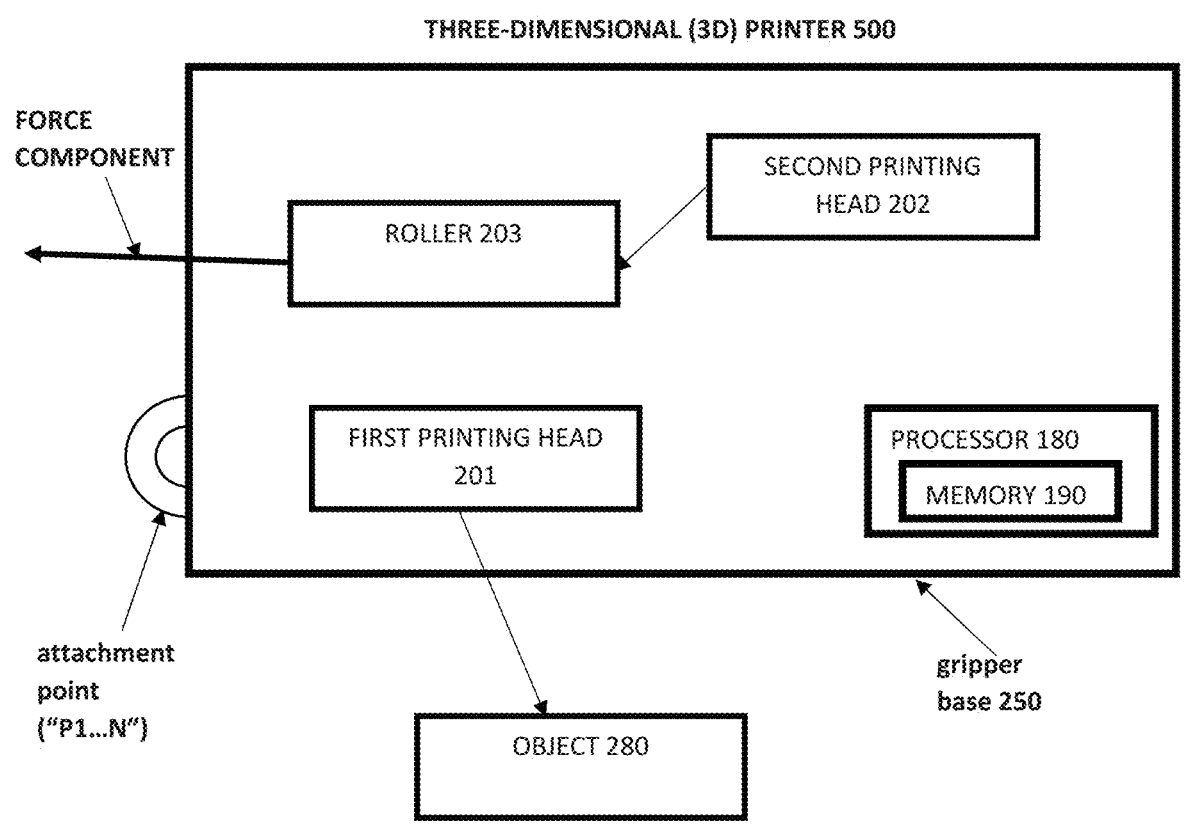
FIG. 5 exemplarily depicts a structure of the 3D printer.
Figure 6:
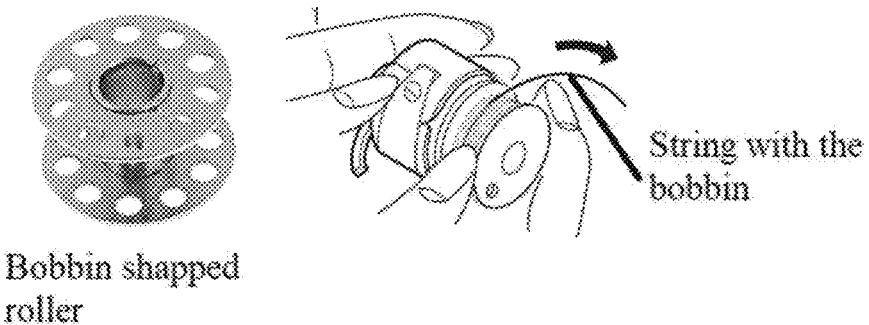
FIG. 6 exemplarily depicts a structure of a roller 203.

The 3D printer includes one or more points where the string can be connected/attached (e.g., attached at P1, P2, and P3 to a "hook" like structure such as shown in FIG. 5). The string can be rolled inside the 3D printer on a roller 203 such as shown in FIG. 6, or the string can be an external control system. For example, the string can be rolled inside a barrel within the 3D printer and can also be expanded as required by the printing process.

As shown in FIG. 5, the 3D printer 500 further includes a processor 180 and a memory 190 that can be configured to analyze the surrounding (e.g., environment) in any surrounding if 3D printing is to be performed in any overhang area (i.e., a computer-implementation of the method 100). That is, the system 200 can include a computing capability to perform an analysis via the processor 180 and memory 190. It is noted that the processor 180 and memory 190 can include connection capability for communication with a server (i.e., a cloud computing environment).

For example, the memory 190 can store instructions that can execute the method 100 via the processor 180. Thereby, the controller processor 180 can be connected to each of components in the 3D printer 500, The invention can use any structural simulation software that is run by the processor 180 to identify the stability of the structure, and which structure will be having problem. In one embodiment, the structural simulation can be done in a cloud server, and while printing is in progress, the system will perform real time simulation, and will be sending commands to the 3D printers.

Also, the 3D printer 500 can be connected to a network such as a cloud computing environment or the internet so that off-site printing can be performed. For example, it is beneficial to have the computing programs for determining the printing be off-site from the actual printer itself. The network connection of the 3D 500 printer can allow for a connection between the off-site printer and the operator.

Based on an analysis or preferably a historical force component analysis, the system 200 can identify how the 3D printer 500 can print the overhang portion. The analysis also includes analyzing the 3D printing material property to determine a time required for solidification, and a strength of the material after solidification.

In one embodiment, the string can also be printed via the 3D printer 500. That is, the 3D printer 500 can be equipped with a string printing unit (e.g., a "second printing head 202") that is able to print the string to the roller 203 such that the string can be deployed.

In other words, the 3D printer 500 can also use a secondary material to print the string, and this can be done with the second printing head 202. Therefore, the 3D printer 500 can include a first printing head 201 for printing the object 280 and a second printing head 202 for printing the string. It is noted that the invention is not limited to providing separate printing heads for the printing of the object 280 and the printing of the string.

That is, while FIG. 5 shows two separate printing heads, one head could be provided to perform both printing operations (i.e., string and object 280) in sequence. When any 3D printing is performed, the system 200 identifies how the string should be arranged so that proper support can be provided to the 3D printer 500. In doing the stability analysis, the system 200 identifies a different hanging portion (i.e., a connection point for the string such as "HP1" (hanging point 1) shown in FIG. 2) of the string so that 3D printer 500 can be made stable. In the stability analysis, the optimum point(s) P1, P2, P3 etc. may be determined. It is noted that the invention is not limited to determining only a single point, but multiple points may be determined.

To connect the string for stability, the system 200 performs a so-called "pairing" operation. In the pairing operation, the string is applied to one or more locking mechanism(s) with a structure (e.g., at the hanging point) and provides support for the 3D printer such that appropriate support is provided during printing which makes the printer more stable and results in a better printed object 280.

Figure 7:
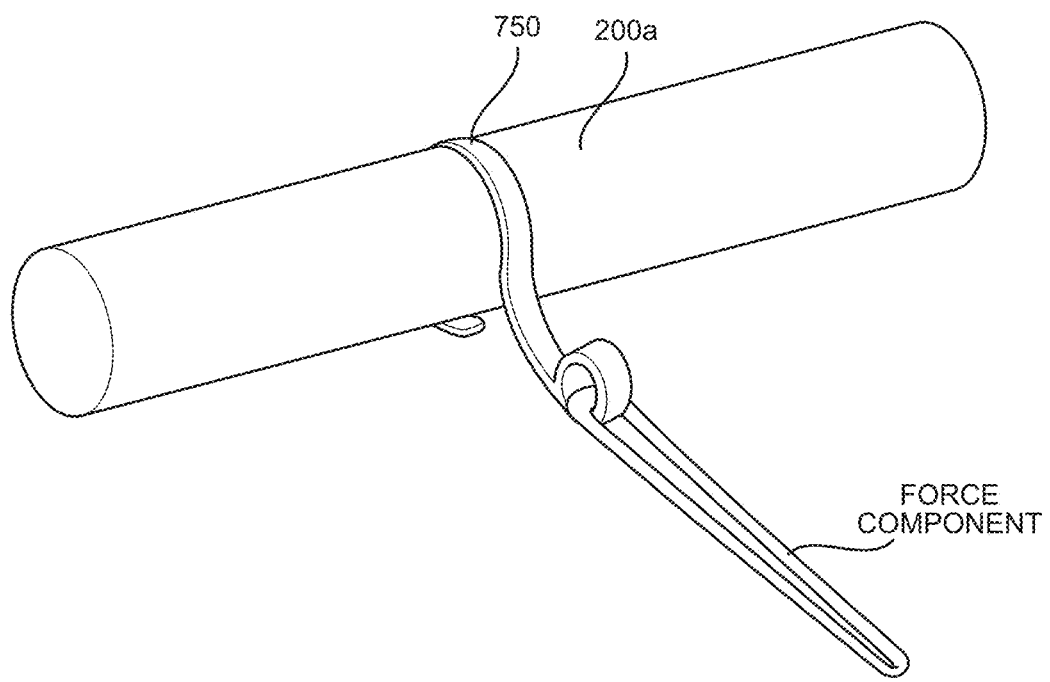

The 3D printer can attach the string at a particular place (i.e., a locking mechanism such as HP1), and accordingly the 3D printer can start moving and print the target areas once the string is attached. FIG. 7 exemplarily depicts a hook 750 attached to the force component which in turn attaches to the structure 200a.

The 3D printer will be creating an appropriate base, and the base will be providing appropriate support on the object 280 that is printed. The string creates force components to hang the 3D printer at a proper place, and at the same time, the system 200 prints the overhang area. The 3D printer includes the "gripper" base 250 (e.g., as depicted in FIG. 3) to provide support during printing, while the 3D printer itself is supported by the string(s).

Once the 3D printer validates the solidification time, the gripper base 250 is released from the overhang printed portion. And, once the first area is printed, then the 3D printer creates a next portion of the object 280 and a next portion for the string is provided to provide proper support. Alternatively, the system 200 can ensure appropriate expansion and rolling of the string based on the movement of the 3D printer to allow the 3D printer to remain stable while moving for printing. After the printing is performed, the system 200 releases the string and the string is rolled inside the 3D printer or an external string mechanism.

FIG. 1 describes a method 100 for operating the system 200. More specifically, in step 101, a force component is created from different directions, via a rollable string mechanism that is attached to a three-dimensional (3D) printer that prints an object 280, to support the 3D printer and the object 280.

In step 102, an overhang printed portion (e.g., see FIG. 3) of the object 280 is gripped via a gripping base mechanism provided on the 3D printer. In step 103, a solidification level of the overhang printed portion is validated (i.e., analyzed to determine the solidification level of the overhang printed portion to determine a validation of a structural rigidity/integrity of the overhang printed portion). A grip of the gripping base mechanism on the overhang printed portion is released in step 104 based on a result of the validating.

In the analysis, the shape and dimension of the structure is identified, a stability of the object 280 and 3D printer is identified via a simulation engine, a load distribution is calculated, a weight of the 3D printed material is determined, the deformation of the object 280 is predicted via a sensor feed, and the invention takes a proactive step action to stabilize the object 280 and printer with the force component.

In step 105, the rollable string mechanism is expanded or rolled based on an amount of a movement and a direction of the movement of the 3D printer to dynamically provide the force component as the 3D printer moves in different directions. In other words, in step 105, the string is adjusted so that the 3D printer has proper support as the 3D printer moves (i.e., by providing an appropriate force via the string tension).

It is noted that after step 101, the invention can proceed to step 105 instead of step 102, or can proceed from step 105 back to step 102 and repeat the process until printing is complete.

Thus, the method 100 provides steps to support the 3D printer via strings during printing, support the overhang portion of the object 280 to the 3D printer to avoid deformation (e.g., see FIG. 4), and dynamically adjust the strings to move the 3D printer during printing to maintain support of the printer during the movement.

The system 200 and the method 100 have exemplary benefits obtained via the structural design and method of operation over existing techniques in that the 3D printer is attached with one or more rollable string mechanism(s) to provide physical support to the 3D printer and also to the overhang printing portion. Each string mechanism creates appropriate force components (e.g., "F1", "F2", "F3" shown in FIG. 2) from different directions and will provide appropriate support to the printer and the object 280 is being printed. Based on the dimension and type of overhang 3D printing needed in any surrounding, the invention identifies how the rollable strings are to be attached and the strings are locked and provide physical support accordingly with appropriate lock mechanisms.

Moreover, the 3D printer is attached with a gripping base mechanism to grip the overhang printed portion or to provide physical support, and when the overhang portion is printed, the gripper 250 provides physical support to the printed portion until the time it is solidified.

With the method 200, the 3D printer and system 200 thereof can validate the solidification level of the printed overhang portion, and accordingly release the grip, and the 3D printer can move on to printing a next overhang portion. In accordance with the movement to the next overhang portion, the rollable string mechanism expands or rolls based on the movement amount and direction of movement of the 3D printer and continues to provide appropriate force direction to make the 3D printer stable.

In one embodiment, the invention is also capable of printing the string for the support itself. That is, while overhang printing is being performed, the 3D printer can also print string as needed. In this embodiment, the string can be printed with different material, so that appropriate force component can be created to provide overhang printing. The invention can 3D print the string first. A thickness of the string to print may be determined based on the material used for printing the 3D object 280 to be printed, an angle and an orientation, structure, overhang angle or position, and a number of layers required. Additionally, to speed up printing in a future iteration, the invention may create a repository of a thickness of string printed per material and other identified attributes for future references.

The system considers the overhangs that are prone to curling, sagging, delamination, or collapsing etc. which are because of orientation challenges. That is, in a case of each new layer having less of the previous layer to bond with, this leads to poor quality printing with droopy filament strands, etc. To improve the quality of the overhangs in such situations, the invention may auto suggest the changes needed to optimize the quality of the overhangs, such as, but not limited to, orientation changes, printing speed, temperature settings, layer widths and/or suggesting using supports, etc.

In any multi-3D printing ecosystem, the participating 3D printers collaboratively use strings to create force components to ensure overhang printing can be performed without any deformation. In other words, the printers can be connected to each other via the string and locking mechanism (i.e., the attachment point shown in FIG. 5 included on each of the 3D printers) so that each printer is supported by each other.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (Paas): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 8, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by Way of example, and not limitation, as well as an operating system, one or more application programs, other program modules, and program data, Each of the operating system, one or ore application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18, It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 9:
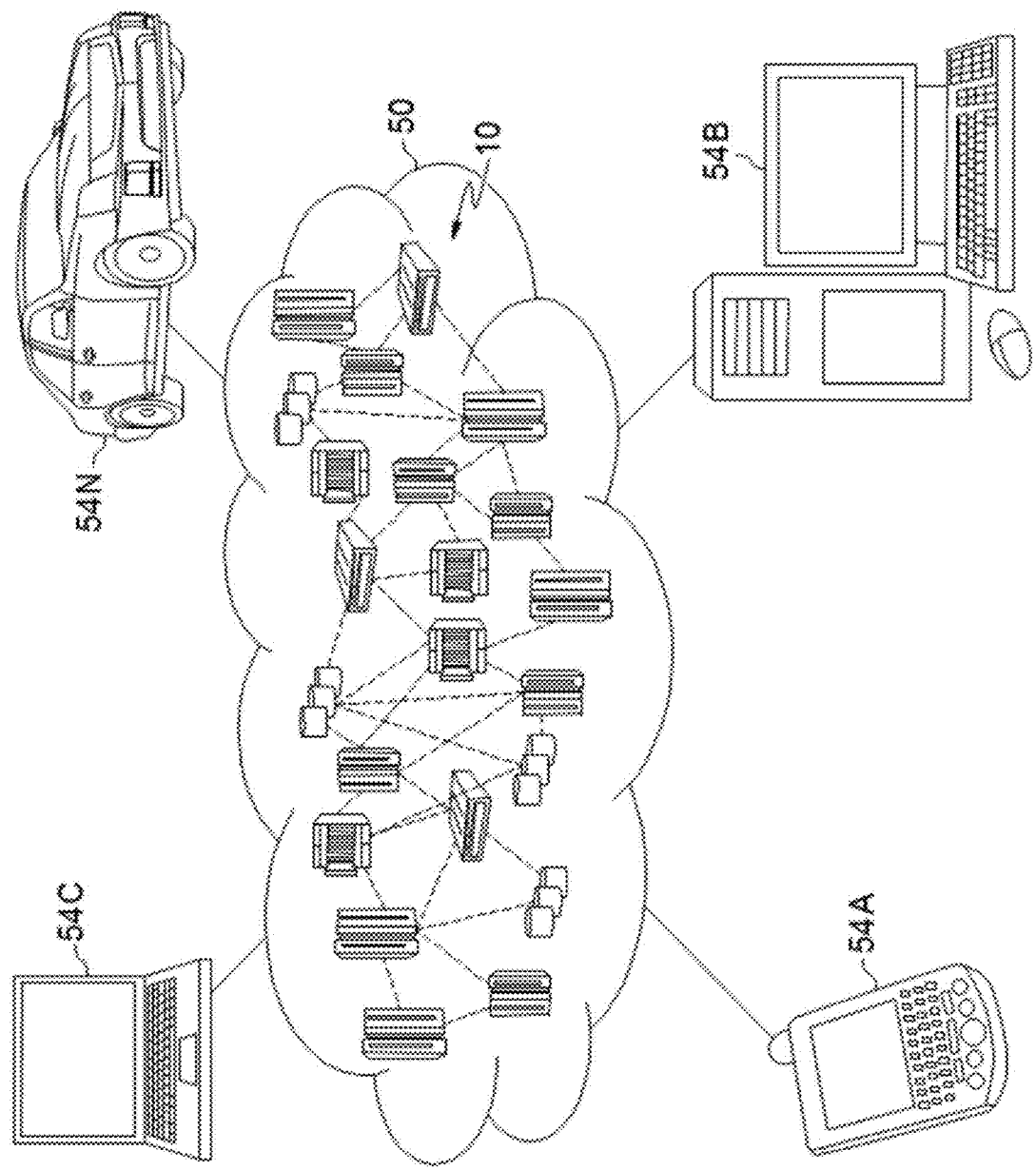
FIG. 9 depicts a cloud-computing environment 50 according to an embodiment of the present invention.

Referring now to FIG. 9, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 9 are intended to be illustrative only and that computing nodes 10 and cloud computing environment 50 can communicate with any type of computerized circuit over any type of network and/or network addressable connection (e.g., using a web browser).

Figure 10:
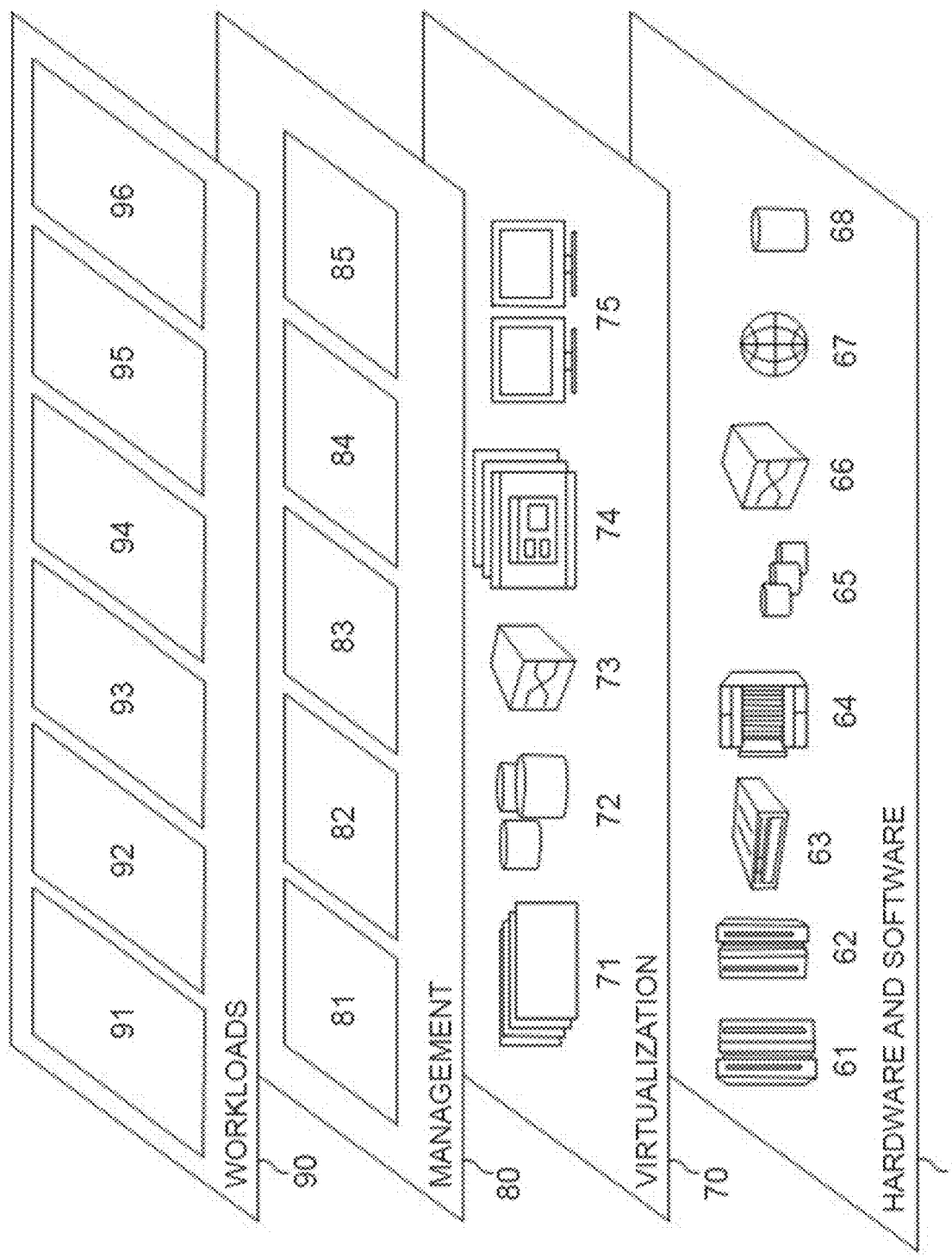
FIG. 10 depicts abstraction model layers according to an embodiment of the present invention.

Referring now to FIG. 10, an exemplary set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to performed tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a Machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A string-based force component creation method that interacts with a three-dimensional (3D) printer that is installed in a printing apparatus and that prints an object, the method comprising:
   receiving, by the 3D printer, instructions for an object to be printed;
   based on a computed simulation of the object to be printed, identifying an arrangement and movement of a force component to support the 3D printer and the object during printing;
   generating and attaching, by the 3D printer, the force component from the 3D printer to the printing apparatus based on the identified arrangement and movement of the force component, wherein the force component comprises a string-based form, and wherein the force component connects within the 3D printer via a roller operated by the 3D printer;
   during the printing of the object, creating a force using the force component as facilitated by operating the roller that supports a weight of the 3D printer and the object, wherein the force component is adjusted by rolling inside the 3D printer and expanding via the roller based on an amount of the movement and a direction of the movement of the 3D printer to dynamically provide stability to the 3D printer using the force component as the 3D printer moves in different directions; and
   gripping an overhang printed portion of the object via a base of the 3D printer by supporting a weight of the object to the base of the 3D printer.

2. The string-based force component creation method of claim 1, further comprising:
   analyzing a solidification level of the overhang printed portion to determine a validation of a structural rigidity of the overhang printed portion; and
   releasing a grip of the overhang printed portion by the 3D printer based on the validation of the structural rigidity of the overhang printed portion.

3. The string-based force component creation method of claim 1, further comprising adjusting a length of the force component to dynamically support the 3D printer based on the amount of the movement and the direction of the movement of the 3D printer.

4. The string-based force component creation method of claim 2, further comprising adjusting a length of the force component by changing to dynamically support the 3D printer based on the amount of the movement and the direction of the movement of the 3D printer.

5. The string-based force component creation method of claim 1, wherein the force component comprises a string.

6. The string-based force component creation method of claim 1, wherein the force component is attached to a locking mechanism disposed on the printing apparatus.

7. The string-based force component creation method of claim 1, further comprising performing a pairing operation by identifying a hanging portion on the printing apparatus to provide stability to the 3D printer by pairing the force component between the hanging portion and the 3D printer.

8. The string-based force component creation method of claim 7, wherein the force component paired between the hanging portion and the 3D printer provides support for the 3D printer while printing the overhang printed portion.

9. The string-based force component creation method of claim 1, further comprising performing a pairing operation by identifying a hanging portion on the printing apparatus to provide stability to the 3D printer by pairing the force component between the hanging portion and the 3D printer.

10. The string-based force component creation method of claim 9, wherein the force component paired between the hanging portion and the 3D printer provides support for the 3D printer while printing the overhang printed portion,
    further comprising finding a different hanging portion to pair with the force component to increase a stability of the 3D printer.

11. The string-based force component creation method of claim 7, wherein the force component is released from the hanging portion upon a completion of printing.

12. The string-based force component creation method of claim 2, further comprising performing a pairing operation by identifying a hanging portion on the printing apparatus to provide stability to the 3D printer by pairing the force component between the hanging portion and the 3D printer.

13. The string-based force component creation method of claim 12, wherein the force component is released from the hanging portion upon the validation of the structural rigidity of the overhang printed portion,
    further comprising rolling the force component back to the 3D printer after the force component is released from the hanging portion.

14. The string-based force component creation method of claim 1, further comprising:
   adjusting a length of the force component to retain stability of the 3D printer while the 3D printer moves during printing.

15. The string-based force component creation method of claim 1, wherein the 3D printer includes:
   a first printing head for printing the object; and
   a second printing head for printing the force component.

16. The string-based force component creation method of claim 1, wherein the 3D printer includes a connection mechanism for connecting the force component to the 3D printer.

* * * * *